Patented Nov. 6, 1923.

1,473,295

UNITED STATES PATENT OFFICE.

COULTER W. JONES, OF MIDLAND, MICHIGAN, ASSIGNOR TO THE DOW CHEMICAL COMPANY, OF MIDLAND, MICHIGAN, A CORPORATION OF MICHIGAN.

METHOD OF RECOVERING BROMINE.

No Drawing. Application filed May 7, 1920. Serial No. 379,469.

*To all whom it may concern:*

Be it known that I, COULTER W. JONES, a citizen of the United States, and a resident of Midland, county of Midland, and State of Michigan, have invented a new and useful Improvement in Methods of Recovering Bromine, of which the following is a specification, the principle of the invention being herein explained and the best mode in which I have contemplated applying that principle, so as to distinguish it from other inventions.

In the so-called Dow process of extracting bromine from natural brines, as described in United States Letters Patent Re. No. 11,232, issued to H. H. Dow, April 12, 1892, the brine is treated to set the bromine free from its chemical combination, whereupon such bromine goes into solution in the brine and is then freed therefrom by an air blast, being finally absorbed with a suitable absorbing reagent from the air used in the blowing out step. The treatment of the brine to free the bromine is generally referred to as an oxidization step, and as stated in the patent in question, may be accomplished electrolytically or by the agency of chlorine gas or by other means. Whatever the agency thus employed, I have found it desirable that the oxidation be carried to a stage where a permanent excess of chlorine is present in the brine; i. e. where the freeing of the bromine is electrolytically accomplished, the electrolysis is carried to a stage beyond that necessary to simply free the bromine, so that a chlorine residuum is left; while if chlorine is employed directly as the agent to free the bromine, more is introduced into the brine than would be required to simply free the bromine.

In any event, there will be presented the problem of eliminating the free chlorine which thus remains in the brine after the oxidation step, and while it has heretofore been undertaken to remove traces of chlorine from the bromine-laden air after the so-called blowing out step by employing suitable purification means, I have found it entirely feasible and much more satisfactory to eliminate such excess chlorine before the bromine is recovered from the brine.

To the accomplishment of the stated object, the invention then consists of the steps hereinafter fully described and particularly pointed out in the claims, the following description setting forth but one of several ways in which the principle of the invention may be utilized.

It is of course known that chlorine will directly react with water to a degree, presumably forming in the first instance hypochlorous acid which then breaks down or gives off oxygen with the resulting formation of hydrochloric and possibly some chloric acid. It is also of course known that this reaction between chlorine and water may be hastened by exposure to sunlight or actinic rays from any source. What I have discovered is that this characteristic of chlorine to unite directly with water may be utilized in a selective fashion so as to cause the elimination of such chlorine in a solution in which bromine is also present in advance of any appreciable reaction between the bromine and the water.

In order to practically apply this discovery to the process in hand, after the oxidization step the brine containing an excess of chlorine as stated may be simply allowed to stand in a suitable tank or other container, a period of approximately six to seven hours being necessary under ordinary conditions and at room temperature to cause the chlorine to substantially entirely disappear as such, if not too largely in excess at the start. However, to facilitate the reaction and avoid the necessity of large storage containers, by exposing the oxidized brine either to sunlight or preferably owing to the uncertainty of the latter being available when desired, to actinic rays such as produced by a mercury vapor lamp, the reaction in question will occur almost instantaneously. In fact, it is necessary to carefully gauge the rate of flow of the brine or in other words the length of time that it is exposed to the action of such light so as to avoid combination of the free bromine.

After treatment in the manner described, the bromine remaining in solution therein is practically pure and upon its being recovered as by the familiar blowing out process or in any other way, it may be utilized directly in the manufacture of commercial bromides, or if recovered without undue dilution with air, it may be liquefied and so utilized in this form.

My improved process is not necessarily limited to treatment of the so-called oxidized brine, i. e. brine in which the bromine has been freed from its compounds along with a quantum of chlorine, but may also be employed successfully in the removal of such excess of chlorine from the gaseous mixture that results from the blowing out step. Assuming, as will naturally be the case, that sufficient moisture, i. e. water, is present in this gaseous mixture, the result of exposure of the same to actinic rays of light will be to cause the preferential combination of such chlorine with the water leaving the free bromine in relatively pure state behind.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In the extraction of bromine from bromide-containing brine, the steps which consist in treating such brine so as to leave free chlorine therein in excess of that required to free the bromine present, thereupon combining such excess chlorine, and then treating the brine to remove the free bromine, substantially as described.

2. In the extraction of bromine from bromide-containing brine, the steps which consist in treating such brine so as to leave free chlorine therein in excess of that required to free the bromine present, thereupon combining such excess chlorine with the water of the brine to form hypochlorous acid or derivatives, and then treating the brine to remove the free bromine, substantially as described.

3. In the extraction of bromine from bromide-containing brine, the steps which consist in treating such brine so as to leave free chlorine therein in excess of that required to free the bromine present, thereupon exposing such brine to actinic rays of light, whereby such excess of chlorine is combined with the water of the brine to form hypochlorous acid or derivatives, and then treating the brine to remove free bromine, substantially as described.

4. The method of purifying bromine, either in liquid solution or gaseous form, from an admixture of chlorine, which consists in exposing such mixture to actinic rays of light in the presence of water, whereby such chlorine preferentially combines with such water, substantially as described.

Signed by me, at Midland, Michigan, this 3d day of May, 1920.

COULTER W. JONES.